US012699930B1

(12) United States Patent
Geerinck et al.

(10) Patent No.: US 12,699,930 B1
(45) Date of Patent: Aug. 4, 2026

(54) BEHAVIORAL ANALYSIS OF AUTONOMOUS ARTIFICIAL INTELLIGENCE (AI) AGENTS DEPLOYED IN REAL-WORLD SYSTEMS

(71) Applicant: AMESA, Inc., Walnut Creek, CA (US)

(72) Inventors: Xavier Geerinck, Nieuwkerken-Waas (BE); Kence Anderson, Martinez, CA (US)

(73) Assignee: AMESA, Inc., Walnut Creek, CA (US)

( * ) Notice: Subject to any disclaimer, the term of this patent is extended or adjusted under 35 U.S.C. 154(b) by 0 days.

(21) Appl. No.: 19/191,414

(22) Filed: Apr. 28, 2025

Related U.S. Application Data

(60) Provisional application No. 63/641,396, filed on May 1, 2024.

(51) Int. Cl.
  *G06N 20/00* (2019.01)
(52) U.S. Cl.
  CPC ..................................... *G06N 20/00* (2019.01)
(58) Field of Classification Search
  CPC ....................................................... G06N 20/00
  See application file for complete search history.

(56) References Cited

U.S. PATENT DOCUMENTS

| 2018/0293463 A1 | 10/2018 | Brown | |
| 2019/0303765 A1* | 10/2019 | Gou | G06N 3/006 |
| 2023/0281504 A1* | 9/2023 | Nair | G06N 20/00 |
| | | | 706/12 |

FOREIGN PATENT DOCUMENTS

| WO | 2018236674 A1 | 12/2018 |
| WO | 2021221801 A1 | 11/2021 |

OTHER PUBLICATIONS

AgentOps Website May 2024.
Anderson, K., Book entitled "Designing Autonomous AI—A Guide for Machine Teaching", Chapter 4, Jun. 10, 2022.
Anderson, K., Book entitled "Designing Autonomous AI—A Guide for Machine Teaching", Chapter 5, Jun. 10, 2022.
Anderson, K., Book entitled "Designing Autonomous AI—A Guide for Machine Teaching", Chapter 7, Jun. 10, 2022.
Anderson, K., Book entitled "Designing Autonomous AI—A Guide for Machine Teaching", Chapter 8, Jun. 10, 2022.
Anderson, K., Book entitled "Designing Autonomous AI—A Guide for Machine Teaching", pp. 135-141, Jun. 10, 2022.

(Continued)

*Primary Examiner* — Brent Johnston Hoover
(74) *Attorney, Agent, or Firm* — Morse, Barnes-Brown & Pendleton PC; Sean D. Detweiler, Esq.

(57) ABSTRACT

A system and method are provided for identifying and outputting data characterizing the behavior exhibited by an autonomous AI agent. The method involves tracking behavior iterations of the autonomous AI agent interacting with an environment during a training or run cycle, collecting iteration data, and transforming the data into an explanation of the behavior exhibited by the agent at different levels of granularity. This transformation includes identifying behavior data for individual iterations, grouping data by episodes representing subsets of all iterations, and capturing behavior data across the entirety of the training or run cycle. The method outputs the data characterizing the behavior exhibited by the autonomous AI agent, providing insights into its performance and learning processes.

30 Claims, 9 Drawing Sheets

(56) References Cited

OTHER PUBLICATIONS

Anderson, K., Book entitled "Designing Autonomous AI—A Guide for Machine Teaching", pp. 188-190, Jun. 10, 2022.

Composable Home Page accessed Sep. 25, 2025 https://autonomy.university/.

Generally Capable Agents Emerge From Open-ended Play (https://deepmind.google/discover/blog/generally-capable-agents-emerge-from-open-ended-play/) Google Deepmind, Jul. 27, 2021, accessed Sep. 25, 2025.

Getting Started Composabl website accessed Sep. 25, 2025 https://docs.composabl.io/.

Sutton, R.S. et al., "Between MDPs and semi-MDPs: A framework for temporal abstraction in reinforcement learning", Artificial Intelligence 112 (1999) 181-211.

* cited by examiner

300

302 — Track iteration during a training or run cycle

304 — Collect iteration data

306 — Transform iteration data into data characterizing the explanation of the behavior exhibited by the autonomous agent at different levels of granularity of the training or run cycle 308 — Output data characterizing the explanation of behavior exhibited by autonomous agent

900

BEHAVIORAL ANALYSIS OF AUTONOMOUS ARTIFICIAL INTELLIGENCE (AI) AGENTS DEPLOYED IN REAL-WORLD SYSTEMS

CROSS-REFERENCE TO RELATED APPLICATION(S)

This application claims priority to, and the benefit of, U.S. Provisional Application 63/641,396, filed May 1, 2024, for all subject matter common to both applications. The disclosure of said provisional application is hereby incorporated by reference in its entirety.

FIELD OF THE INVENTION

The present invention relates to autonomous artificial intelligence (AI) agents suitable for performing tasks. In particular, the present invention relates to providing characterization and analysis of the behavior of autonomous AI agents, enabling dynamic behavior correction.

BACKGROUND

Generally, autonomous systems, such as autonomous AI agents, operate as a black box. That is, during training or deployment of the autonomous system, there is no insight as to how or why the autonomous AI agent makes decisions or behaves in the manner it does. Some have attempted to address this; for example, Google DeepMind published a paper in which agents were created and set to perform a task wherein the behavior of the agents was described at significant points in achieving the goals of the task. However, such behavior reporting still does not accurately represent what led to the reported behavior or explain why the particular behavior was performed, nor does it explain how the agent performed overall.

SUMMARY

Thus, there is a need for the behavior of autonomous AI agents to be explainable. The present invention is directed toward further solutions to address this need, in addition to having other desirable characteristics. Specifically, the present invention provides a system and method for identifying and outputting data characterizing an explanation of behavior exhibited by an autonomous AI agent after completing one or more behavior or action/iteration. This data, in characterizing an explanation of behavior of the autonomous AI agent, indicates what, how, why, and/or when actions were taken (or not taken) by the autonomous AI agent, that resulted in the behavior of the autonomous AI agent during the training or run cycle.

In accordance with embodiments of the present invention, a method of identifying and outputting data characterizing an explanation of behavior exhibited by an autonomous AI agent in such a way that behavior correction can be dynamically implemented is provided. The method involves tracking behavior iterations of an autonomous AI agent reacting with an environment during a training or run cycle of the autonomous AI agent. When the autonomous AI agent is deployed as executable code in a real-world system to control hardware and/or software or in a computer-implemented training platform, the autonomous AI agent exhibits behavior by perceiving the environment, taking actions autonomously to achieve goals, and improving agent performance through learning, collecting iteration data from the tracked iterations, and transforming the iteration data into the data characterizing the explanation of the behavior exhibited by the autonomous AI agent at different levels of granularity of the training or run cycle. The steps of transforming include identifying data characterizing the behavior exhibited by the autonomous AI agent for each individual iteration of a training or run cycle, identifying data characterizing the behavior exhibited by the autonomous AI agent grouped by episodes of the training or run cycle, wherein each episode represents multiple iterations which are a subset of all iterations of an entirety of the training or run cycle, and identifying data characterizing the behavior exhibited by the autonomous AI agent across the entirety of the training or run cycle including all the iterations. The data characterizing the explanation of behavior exhibited by the autonomous AI agent that indicates what, how, why, and/or when for the behavior of the autonomous AI agent during the training or run cycle, enabling dynamic behavior correction for the autonomous AI agent, is then output.

In accordance with aspects of the present invention, the identified data characterizing the behavior exhibited by the autonomous AI agent for an individual iteration comprises a fingerprint indicating what components of the autonomous AI agent were utilized during the iteration.

In accordance with aspects of the present invention, each episode corresponds to behavior by the autonomous AI agent that is identified as significant/interesting. In some such aspects, behavior is identified as significant/interesting based on goals for the autonomous AI agent.

In accordance with aspects of the present invention, the identified data characterizing the behavior exhibited by the autonomous AI agent grouped by episodes comprises a graphical timeline of episodes.

In accordance with aspects of the present invention, the identified data characterizing the behavior exhibited by the autonomous AI agent grouped by episodes comprises an indication of a status of the environment and how the autonomous AI agent reacted at a time of each episode.

In accordance with aspects of the present invention, the identified data characterizing the behavior exhibited by the autonomous AI agent across the entirety of the training or run cycle comprises a combination and clustering of data from the identified data characterizing the behavior exhibited by the autonomous AI agent for each individual iteration of the entirety of the training or run cycle. In some such aspects, the combination and clustering are performed using a machine learning algorithm. In still further aspects, resulting clusters represent states of the autonomous AI agent across the entirety of the training or run cycle.

In accordance with aspects of the present invention, the autonomous AI agent includes one or more sensor modules, optionally one or more perceptor modules, one or more scenario modules, one or more skills modules, and one or more performable actions. In some such aspects, the identified data characterizing the behavior exhibited by the autonomous AI agent of the behavior for each individual iteration of a training or run cycle comprises a graphical indication of which of the: the one or more sensor modules, the optional one or more perceptor modules, the one or more scenario modules, the one or more skills modules, and the one or performable actions of the autonomous AI agent were used in the iteration.

In accordance with aspects of the present invention, the method is performed by the autonomous AI agent.

In accordance with aspects of the present invention, the method is performed by a platform for creating autonomous AI agents.

In accordance with aspects of the present invention, outputting the data characterizing the explanation of behavior exhibited by the autonomous AI agent includes outputting one or more of: identified data characterizing the behavior exhibited by the autonomous AI agent for an individual iteration of a training or run cycle, identified data characterizing the behavior exhibited by the autonomous AI agent of the behavior grouped by episodes of the training or run cycle, and identified data characterizing the behavior exhibited by the autonomous AI agent of the behavior across the entirety of the training or run cycle. In some such aspects, identified data characterizing the behavior exhibited by the autonomous AI agent for an individual iteration of a training or run cycle is outputted in response to selection on an outputted identified data characterizing the behavior exhibited by the autonomous AI agent of the behavior grouped by episodes of the training or run cycle or an outputted identified data characterizing the behavior exhibited by the autonomous AI agent of the behavior across the entirety of training or run cycle.

In accordance with embodiments of the present invention, a system for identifying and outputting data characterizing an explanation of behavior exhibited by an autonomous AI agent in such a way that behavior correction can be dynamically implemented is provided. The system includes a storage holding data and a processor in communication with the storage. The processor is configured to track behavior iterations of an autonomous AI agent reacting with an environment during a training or run cycle of the autonomous AI agent. The autonomous AI agent is deployed as executable code in a real-world system to control hardware and/or software, or in a computer-implemented training platform. The autonomous AI agent exhibits behavior by perceiving the environment, taking actions autonomously to achieve goals, and improving agent performance through learning. The system collects iteration data from the tracked iterations and transforms the iteration data into the data characterizing the explanation of the behavior exhibited by the autonomous AI agent at different levels of granularity of the training or run cycle. The steps of transforming include identifying data characterizing the behavior exhibited by the autonomous AI agent for each individual iteration of a training or run cycle, identifying data characterizing the behavior exhibited by the autonomous AI agent grouped by episodes of the training or run cycle, wherein each episode represents multiple iterations which are a subset of all iterations of an entirety of the training or run cycle, and identifying data characterizing the behavior exhibited by the autonomous AI agent across the entirety of the training or run cycle including all the iterations. The system outputs data characterizing the explanation of behavior exhibited by the autonomous AI agent that indicates what, how, why, and/or when for the behavior of the autonomous AI agent during the training or run cycle, enabling dynamic behavior correction for the autonomous AI.

In accordance with aspects of the present invention, the system further includes a display in communication with the processor configured to display the data characterizing the explanation of behavior exhibited by the autonomous AI agent output by the processor.

In accordance with aspects of the present invention, the system also executes the autonomous AI agent.

In accordance with aspects of the present invention, the identified data characterizing the behavior exhibited by the autonomous AI agent for an individual iteration comprises a fingerprint indicating what components of the autonomous AI agent were utilized during the iteration.

In accordance with aspects of the present invention, each episode corresponds to behavior by the autonomous AI agent that is identified as significant/interesting. In some such aspects, behavior is identified as significant/interesting based on goals for the autonomous AI agent.

In accordance with aspects of the present invention, the identified data characterizing the behavior exhibited by the autonomous AI agent grouped by episodes comprises a graphical timeline of episodes.

In accordance with aspects of the present invention, the identified data characterizing the behavior exhibited by the autonomous AI agent grouped by episodes comprises an indication of a status of the environment and how the autonomous AI agent reacted at a time of each episode.

In accordance with aspects of the present invention, the identified data characterizing the behavior exhibited by the autonomous AI agent across the entirety of the training or run cycle comprises a combination and clustering of data from the identified data characterizing the behavior exhibited by the autonomous AI agent for each individual iteration of the entirety of the training or run cycle. In some such aspects, the combination and clustering are performed using a machine learning algorithm. In further aspects, resulting clusters represent states of the autonomous AI agent across the entirety of the training or run cycle.

In accordance with aspects of the present invention, the autonomous AI agent includes one or more sensor modules, optionally one or more perceptor modules, one or more scenario modules, one or more skills modules, and one or more performable actions. In some such aspects, the identified data characterizing the behavior exhibited by the autonomous AI agent of the behavior for each individual iteration of a training or run cycle comprises a graphical indication of which of: the one or more sensor modules, the optional one or more perceptor modules, the one or more scenario modules, the one or more skills modules, and the one or performable actions of the autonomous AI agent were used in the iteration.

In accordance with aspects of the present invention, outputting the data characterizing the explanation of behavior exhibited by the autonomous AI agent includes outputting one or more of: identified data characterizing the behavior exhibited by the autonomous AI agent for an individual iteration of a training or run cycle, identified data characterizing the behavior exhibited by the autonomous AI agent of the behavior grouped by episodes of the training or run cycle, and identified data characterizing the behavior exhibited by the autonomous AI agent of the behavior across the entirety of the training or run cycle. In some such aspects, identified data characterizing the behavior exhibited by the autonomous AI agent for an individual iteration of a training or run cycle is outputted in response to selection on an outputted identified data characterizing the behavior exhibited by the autonomous AI agent of the behavior grouped by episodes of the training or run cycle or an outputted identified data characterizing the behavior exhibited by the autonomous AI agent of the behavior across the entirety of training or run cycle.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
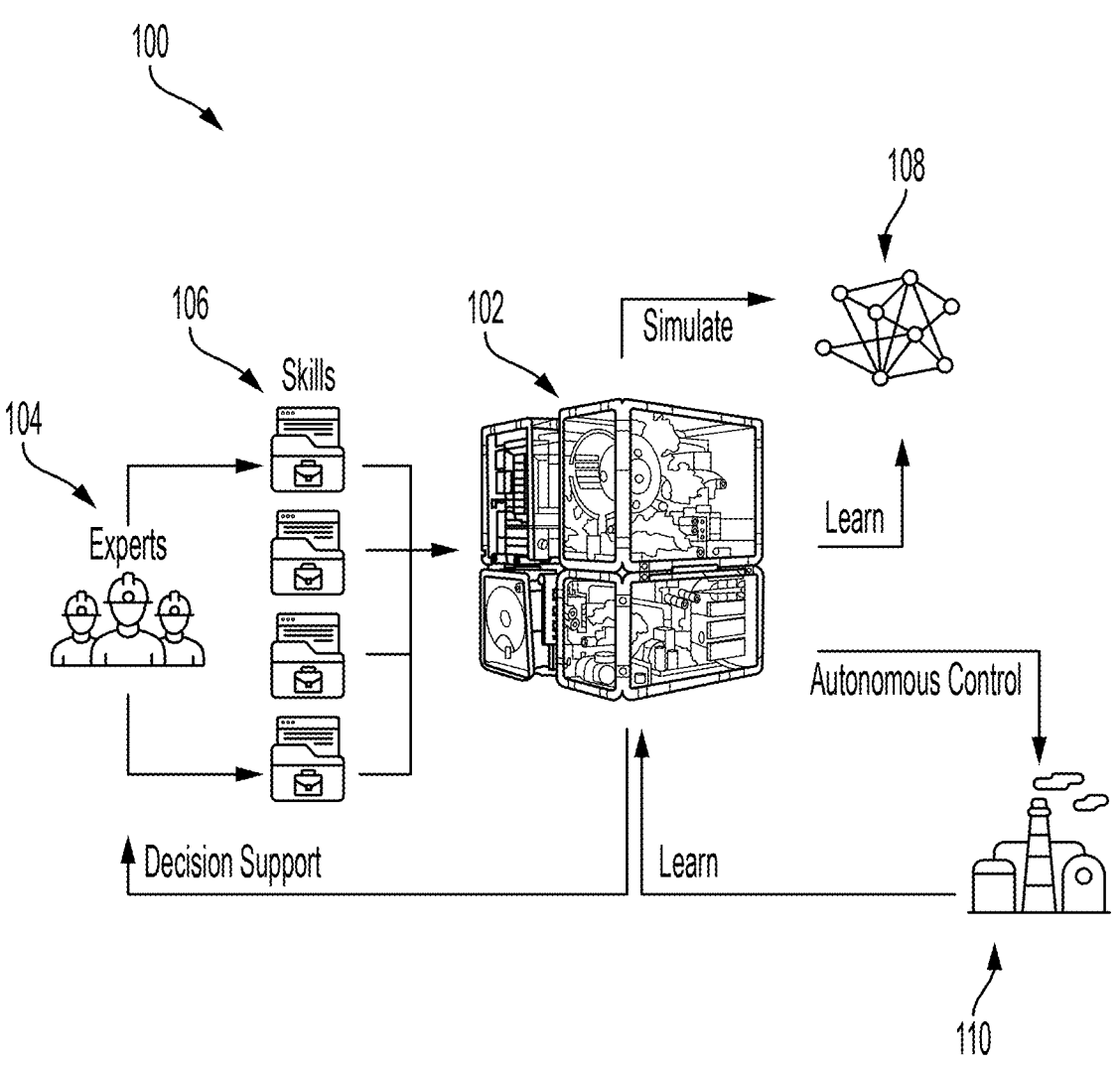
FIG. 1 is a diagrammatic illustration of the environments and inputs involved with the development, training, and deployment of an autonomous AI agent in accordance with embodiments of the present invention.

Illustrative embodiments of the present invention relate to a method and system for identifying and outputting data characterizing the behavior exhibited by an autonomous AI agent. As utilized herein, "autonomous AI agents" are self-governing systems that can perceive their environment and act on it without constant human control. The method involves tracking behavior iterations of the autonomous AI agent interacting with an environment during a training or run cycle, collecting iteration data, and transforming the data into an explanation of the behavior exhibited by the agent at different levels of granularity. The transformation of data into the explanation includes identifying behavior data for individual iterations, grouping data by episodes representing subsets of all iterations, and capturing behavior data across the entirety of the training or run cycle. The method outputs the data characterizing the behavior exhibited by the autonomous AI agent, providing insights into the autonomous AI agent's performance and learning processes. By providing different levels of granularity for the behavior of the autonomous AI agent, a more complete explanation of the how and why of an autonomous AI agent's behavior can be more completely explored. That is, in addition to reporting on the significant events or episodes of the behavior of the autonomous AI agent, the present invention also provides insight into the individual iterations that contributed to or resulted in the significant episodes. Furthermore, the overall status or effectiveness of the autonomous AI agent across the whole cycle can also be investigated. This allows for an understanding of what was involved, how it was involved, why it was involved, and when it was involved. This, in turn, enables earlier and more effective behavior correction for the autonomous AI agent.

FIG. 1 through FIG. 9, wherein like parts are designated by like reference numerals throughout, illustrate an example embodiment or embodiments of a method and system for identifying and outputting data characterizing the behavior exhibited by an autonomous AI agent, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 is a diagrammatic illustration showing a conceptual representation 100 of the environments and inputs involved with the development, training, and deployment of an autonomous AI agent 102. On the left of the autonomous AI agent 102 are experts 104 who possess the know-how and expertise of how to perform a task. This know-how and expertise are captured as skills 106 in the creation of the autonomous AI agent 102 for performing the task. The autonomous AI agent 102 can then be provided a computer-implemented training platform (simulation environment) 108 in which skills 106 can be learned and the autonomous AI agent 102 can be trained to perform the task. Once trained, the autonomous AI agent can be deployed in a real-world system 110 to control hardware and/or software. The autonomous AI agent 102 learns, adapts, and improves both the autonomous AI agent's performance of the task, and the skills used to perform the task.

In certain embodiments, the autonomous AI agent 102 is built using modules representing the functionality of the autonomous AI agent 102. A block diagram representation of such an autonomous AI agent 102 can be seen in FIG. 2.

Figure 2:
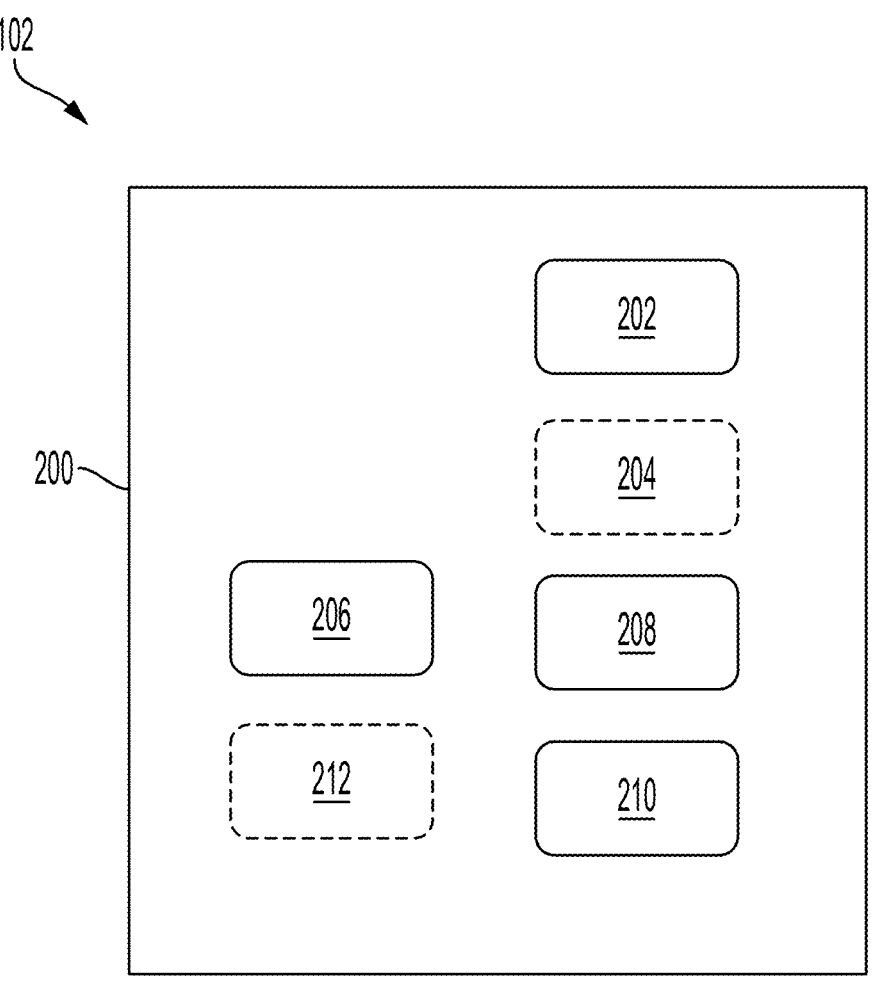
FIG. 2 is a block diagram representation of an autonomous AI agent in accordance with embodiments of the present invention.

In the example of FIG. 2, the autonomous AI agent 102 comprises framework 200, one or more sensor modules 202, optionally one or more perceptor modules 204, one or more scenario modules 206, one or more skills modules 208, and one or more performable actions 210. In certain embodiments, the autonomous AI agent 102 may further comprise one or more defined goals 212. The various components of the autonomous AI agent are implemented as software.

The agent framework 200 is configured to receive modules to result in the autonomous AI agent 102. Sensor modules 202 are configured to provide feedback to the autonomous AI agent 102 from the environment (a computer-implemented training platform 108 or real-world system 110) in which the autonomous AI agent 102 is operating. Perceptor modules 204 are configured to receive sensor variables, process the sensor variables, and output one or more new sensor variables. Scenario modules 206 are configured to operate autonomous AI agents 102 to enable the autonomous AI agents to execute tasks. Scenario modules 206 may be created to represent sub-routines or intermediate tasks needed to perform the larger task of the autonomous AI agent 102. Skills modules 208 are configured to execute specific tasks using data characterizing real-world expertise (skills 106) that the skills modules 208 embody, resulting in an action performed by the autonomous AI agent 102. Performable actions 210 are the results of skills performed by skills modules 208. Goals 212 may be associated with scenario modules 206, skills modules 208, and/or the autonomous AI agent 102 and represent what is to be achieved by those components.

Autonomous AI agents 102 are trained by a concept known as Reinforcement Learning. A reinforcement learning autonomous AI agent 102 interacts with an environment, such as a computer-implemented training platform 108 or a real-world system 110. The environment is represented as an MDP=Markov Decision Process, which allows specific states of an environment at any given moment in time to be set. During the interaction, the autonomous AI agent 102 receives an observation (via sensor modules 202 and/or perceptor modules 204) and, based on that observation, calculates (via skills modules 208) a performable action 210 to achieve a certain goal 212. Each of these interactions is named an "iteration". A set of interactions/iterations is named an "episode". During such episodes (multiple iterations), the autonomous AI agent 102 makes an attempt to accomplish a certain goal 212. A culmination of all the iterations and episodes is referred to as a "training or run cycle", where a "training cycle" is when the autonomous AI agent is operated in a computer-implemented training platform 108 and a "run cycle" is when the autonomous AI agent 102 is deployed in a real-world system 110.

Figure 3:
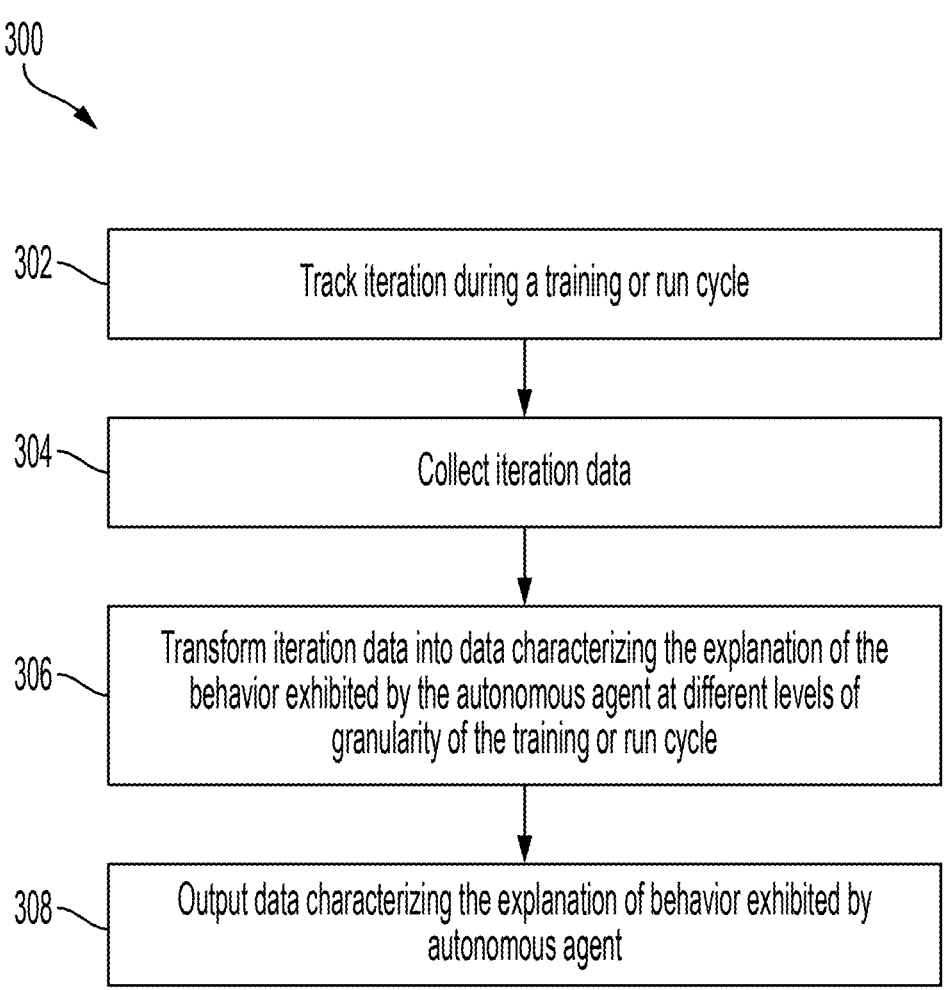
FIG. 3 is an example flowchart of a method for identifying and outputting data characterizing the behavior exhibited by an autonomous AI agent in accordance with embodiments of the present invention.

FIG. 3 depicts an example flowchart 300 of a method of identifying and outputting data characterizing an explanation of behavior exhibited by an autonomous AI agent in such a way that behavior correction can be dynamically implemented. When the autonomous AI agent 102 is deployed as executable code in a real-world system 110 to control hardware and/or software or in a computer-implemented training platform 108, the autonomous AI agent 102 exhibits behavior by perceiving the environment, taking actions autonomously to achieve goals, and improving agent performance through learning. The first step of the method involves tracking behavior iterations of an autonomous AI agent reacting with an environment during a training or run cycle of the autonomous AI agent (Step 302). Then, iteration data from the tracked iterations is collected (Step 304). The iteration data is then transformed into the data characterizing the explanation of the behavior exhibited by the autonomous AI agent at different levels of granularity of the training or run cycle (Step 306). Finally, the data characterizing the explanation of behavior exhibited by the autonomous AI agent that indicates what, how, why, and/or when for the behavior of the autonomous AI agent during the training or run cycle, enabling dynamic behavior correction for the autonomous AI agent, is outputted (Step 308).

Figure 4:
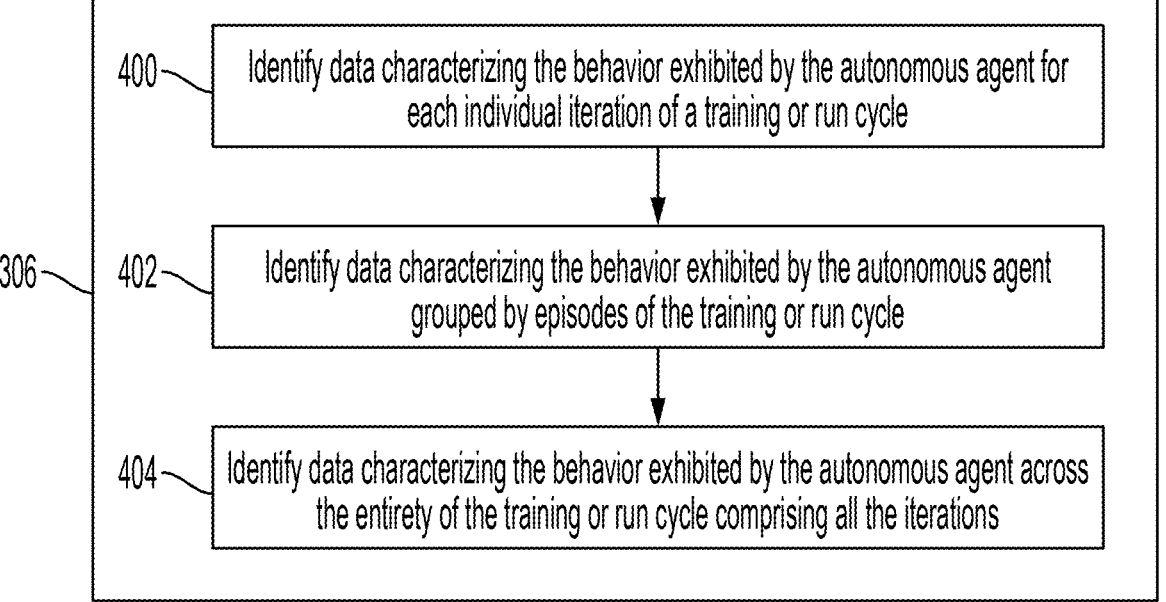
FIG. 4 is an example diagram identifying the additional steps involved in transforming iteration data into the data characterizing the explanation of the behavior exhibited by the autonomous AI agent at different levels of granularity of the training or run cycle in accordance with embodiments of the present invention.

FIG. 4 depicts the additional steps that may performed as part of the step of transforming iteration data into the data characterizing the explanation of the behavior exhibited by the autonomous AI agent at different levels of granularity of the training or run cycle (step 306). These include: identifying data characterizing the behavior exhibited by the autonomous AI agent for each individual iteration of a training or run cycle (Step 400); identifying data characterizing the behavior exhibited by the autonomous AI agent grouped by episodes of the training or run cycle, wherein each episode represents multiple iterations which are a subset of all iterations of an entirety of the training or run cycle (Step 402); and identifying data characterizing the behavior exhibited by the autonomous AI agent across the entirety of the training or run cycle comprising all the iterations (step 404).

Figure 5:
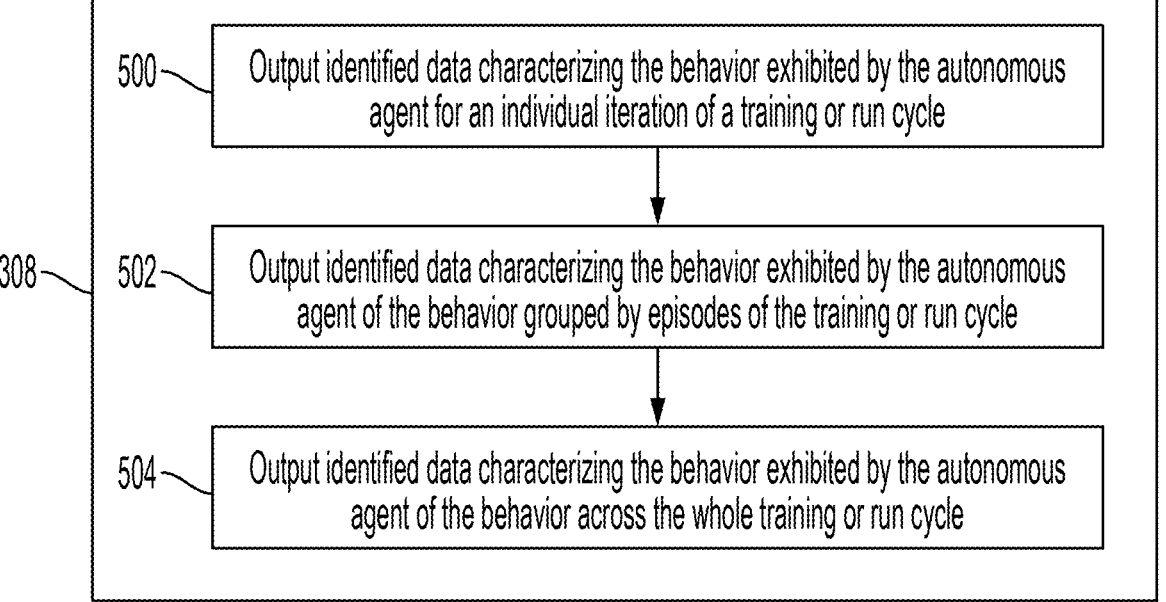
FIG. 5 is an example diagram identifying the additional steps involved in outputting the data characterizing the explanation of behavior exhibited by the autonomous AI agent in accordance with embodiments of the present invention.

FIG. 5 depicts the additional steps that may performed as part of the step of outputting the data characterizing the explanation of behavior exhibited by the autonomous AI agent. These include outputting one or more of: identified data characterizing the behavior exhibited by the autonomous AI agent for an individual iteration of a training or run cycle (Block 500); identified data characterizing the behavior exhibited by the autonomous AI agent of the behavior grouped by episodes of the training or run cycle (Block 502); and identified data characterizing the behavior exhibited by the autonomous AI agent of the behavior across the whole training or run cycle (Block 504).

Figure 6:
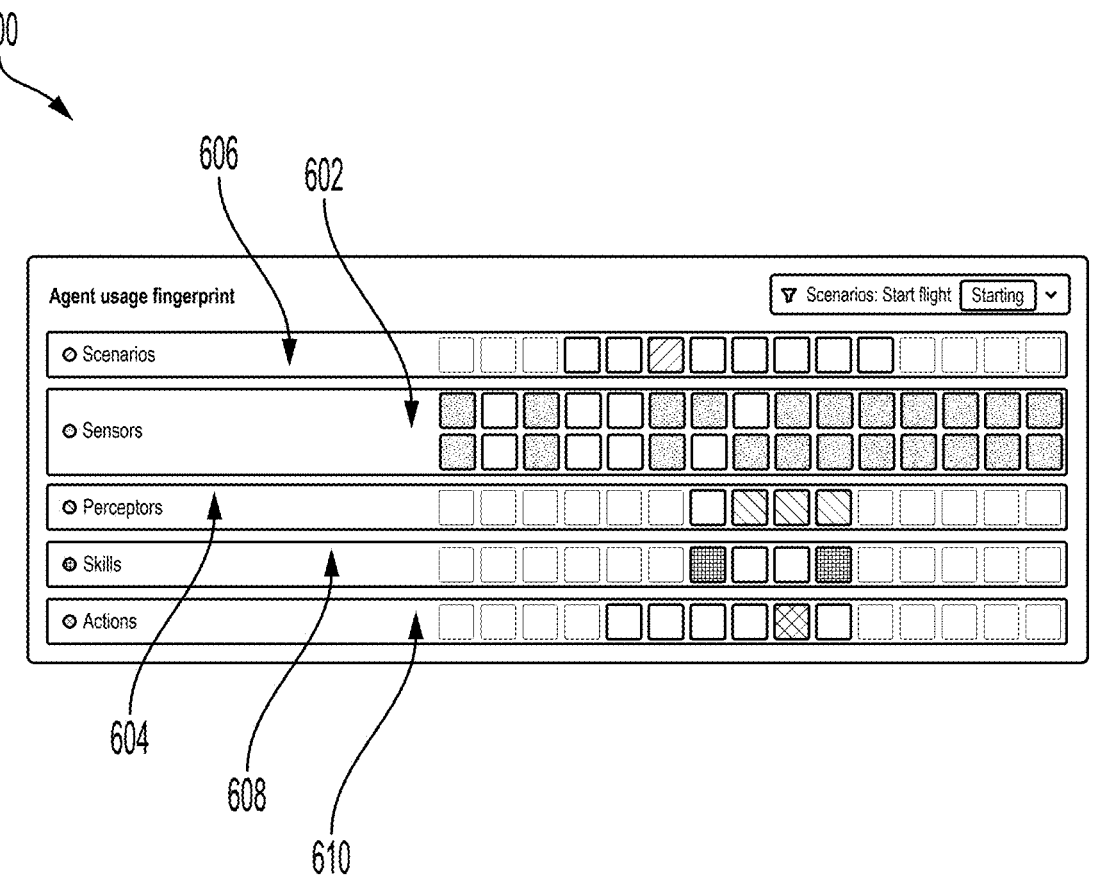
FIG. 6 depicts the identified data characterizing the behavior exhibited by the autonomous AI agent for an individual iteration of a training or run cycle that is outputted in accordance with embodiments of the present invention.

An example of data characterizing the behavior exhibited by the autonomous AI agent for an individual iteration of a training or run cycle that is identified (Step 400) and outputted (Block 500) can be seen in FIG. 6. Here the identified data characterizing the behavior exhibited by the autonomous AI agent 102 for an individual iteration of a training or run cycle comprises a fingerprint 600 indicating what components of the architecture of the autonomous AI agent were utilized during the iteration. In this embodiment, the fingerprint 600 comprises: a graphical indication 602 of which of the one or more sensor modules 202 of the autonomous AI agent 102 were used in the iteration, a graphical indication 604 of which of the optional one or more perceptor modules 204 of the autonomous AI agent 102 were used in the iteration, a graphical indication 606 of which of the one or more scenario modules 206 of the autonomous AI agent 102 were used in the iteration, a graphical indication 608 of which of the one or more skills modules 208 of the autonomous AI agent 102 were used in the iteration, and a graphical indication 610 of which of the one or performable actions 210 of the autonomous AI agent 102 were used in the iteration.

Figure 7:
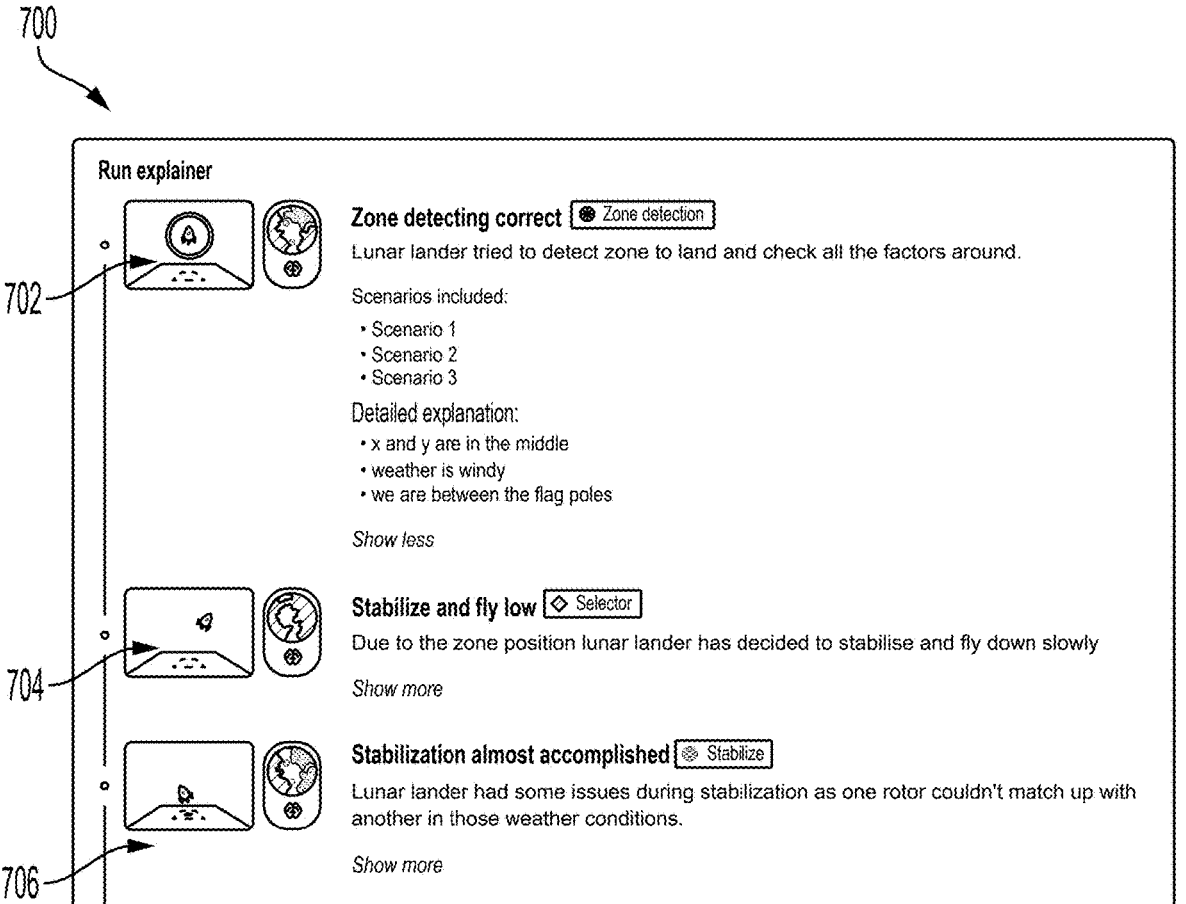
FIG. 7 depicts the identified data characterizing the behavior exhibited by the autonomous AI agent 102 grouped by episodes of the training or run cycle that is outputted in accordance with embodiments of the present invention.

An example of data characterizing the behavior exhibited by the autonomous AI agent grouped by episodes of the training or run cycle that is identified (Step 402) and outputted (Block 502) can be seen in FIG. 7. Here the identified data characterizing the behavior exhibited by the autonomous AI agent 102 grouped by episodes of the training or run cycle comprises a graphical timeline 700 of episodes 702, 704, 706. Each episode 702, 704, 706 corresponds to behavior by the autonomous AI agent 102 that is identified as significant/interesting. In some embodiments, behavior is identified as significant/interesting based on the goals 212 of the autonomous AI agent (wherein a score is awarded for how close to a goal the behavior got). Each episode 702, 704, 706 may further comprise an indication of the status of the environment and how the autonomous AI agent reacted at the time of each episode. In some such embodiments, this is done by using the unique MDP characteristics of an environment together with a highlight of how the Neural Network model was activated. This in turn can be combined with additional information on the description of an agent (e.g., Scenarios, Data Points, . . . ) to generate a Name and Description through an LLM model to make it human-readable.

Figure 8:
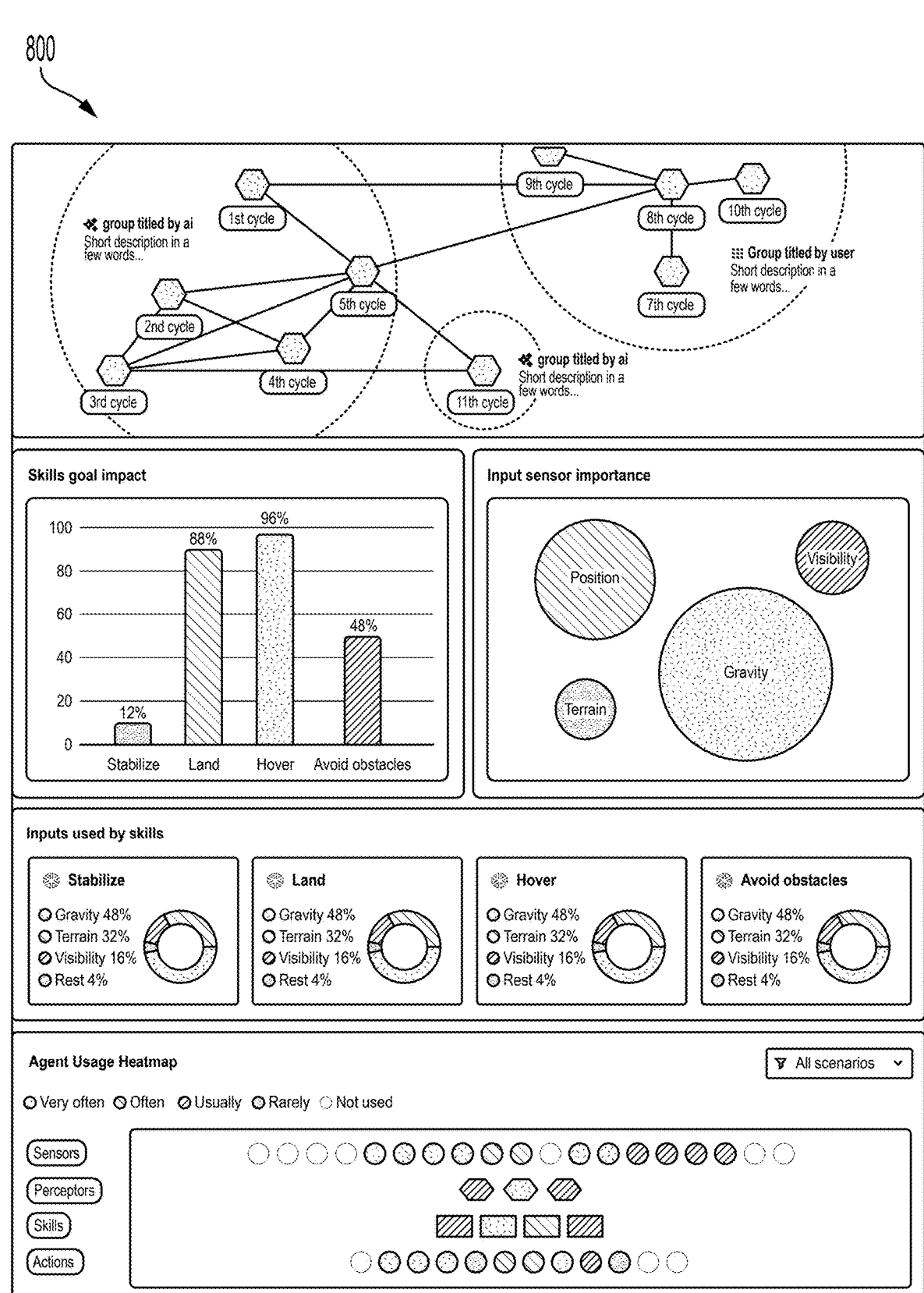
FIG. 8 depicts the identified data characterizing the behavior exhibited by the autonomous AI agent 102 across the whole training or run cycle that is outputted in accordance with embodiments of the present invention.

An example of data characterizing the behavior exhibited by the autonomous AI agent of the behavior across the whole training or run cycle that is identified (Step 404) and outputted (Block 504) can be seen in FIG. 8. Here the identified data characterizing the behavior exhibited by the autonomous AI agent 102 across the whole training or run cycle comprises a combination and clustering of data 800 from the identified data characterizing the behavior exhibited by the autonomous AI agent for each individual iteration (fingerprint 600) combined across of the whole training or run cycle (an order of millions of iterations). In certain embodiments, the combination and clustering are performed using a machine learning algorithm (e.g., k-Means). In some such embodiments, the resulting clusters represent states of the autonomous AI agent across the whole training or run cycle. In such cases, the user can select the different states and get the corresponding agent usage (such as episodic graphical timeline 700 or fingerprint 600) for deep-dive problem solving. Indeed, in many embodiments, the other levels of granularity can be selected and outputted via the currently outputted level of granularity. For example, identified data characterizing the behavior exhibited by the autonomous AI agent for an individual iteration of a training or run cycle (fingerprint 600) can be outputted in response to selection on an outputted identified data characterizing the behavior exhibited by the autonomous AI agent of the behavior grouped by episodes (graphical timeline 700) of the training or run cycle or an outputted identified data characterizing the behavior exhibited by the autonomous AI agent of the behavior across the whole training or run cycle (combination and clustering of data 800).

In certain embodiments, the method set forth in FIG. 3 through FIG. 5 is performed by the autonomous AI agent 102 itself. In other embodiments, the method is performed by a platform for creating autonomous AI agents.

Figure 9:
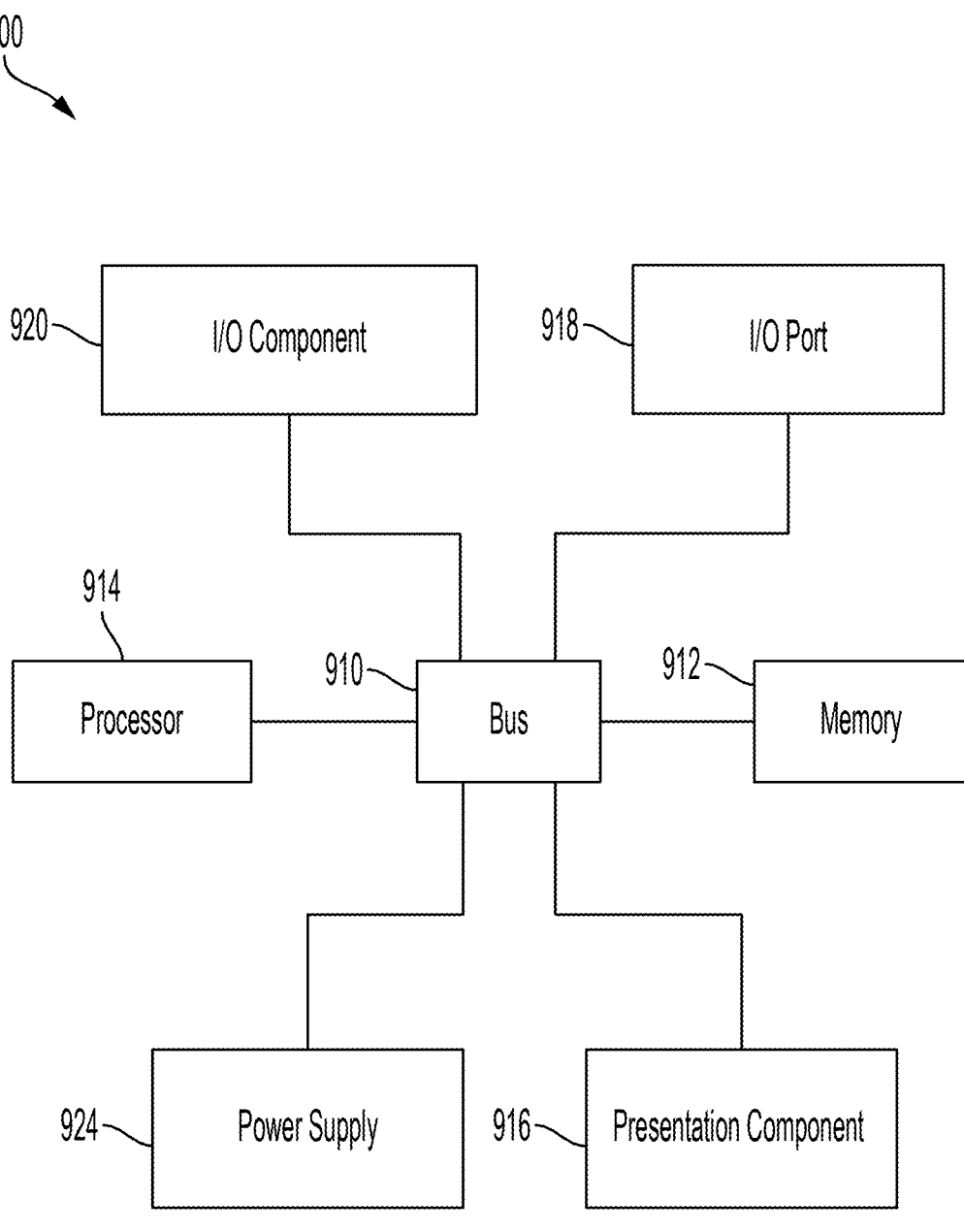
FIG. 9 is a diagrammatic illustration of a high-level architecture for implementing the platform in accordance with embodiments of the present invention.

A suitable and specifically configured electronic or computing device can be used to implement the functionality of the present invention described herein. One illustrative example of such an electronic or computing device 900 is depicted in FIG. 9. The computing device 900 is merely an illustrative example of a suitable computing environment and in no way limits the scope of the present invention. A "computing device," as represented by FIG. 9, can include a "workstation," a "server," a "laptop," a "desktop," a "device", a "smart device", a "tablet", a "smartphone", an "ECR" or other specifically configured computing devices, as would be understood by those of skill in the art. Given that the computing device 900 is depicted for illustrative purposes, embodiments of the present invention may utilize any number of computing devices 900 in any number of different ways to implement a single embodiment of the present invention. Accordingly, embodiments of the present invention are not limited to a single computing device 900, as would be appreciated by one with skill in the art, nor are they limited to a single type of implementation or configuration of the example computing device 900.

The computing device 900 can include a bus or network 910 that can be coupled to one or more of the following illustrative components, directly or indirectly: a memory 912, one or more processors 914, one or more presentation components 916, input/output ports 918, input/output components 920, and a power supply 924.

One of skill in the art will appreciate that the bus 910 can include one or more busses, such as an address bus, a data bus, networks, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 900 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD), Solid State Drive (SSD), cloud, or other optical or holographic media; magnetic cassettes, magnetic tape, magnetic disk storage or other magnetic storage devices that can be used to encode information and can be accessed by the computing device 900.

The memory 912 can include computer-storage media in the form of volatile and/or nonvolatile memory for holding data. The memory 912 may be removable, non-removable, or any combination thereof. Exemplary hardware devices are devices such as hard drives, solid-state memory, optical-disc drives, and the like. The computing device 900 can include one or more processors that read data from components such as the memory 912, the various I/O components 920, etc. Presentation component(s) 916 present data indications to a user or other device. Exemplary presentation components include a display device, speaker, printing component, vibrating component, etc.

The I/O ports 918 can enable the computing device 900 to be logically coupled to other devices, such as I/O components 920 using serial, parallel, or network, and/or wireless communication protocols. Some of the I/O components 920 can be built into the computing device 900. Examples of such I/O components 920 include a microphone, joystick, recording device, gamepad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way that enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method of identifying and outputting data characterizing an explanation of behavior exhibited by an autonomous AI agent in such a way that behavior correction can be dynamically implemented, the method comprising:

providing an autonomous agent that when deployed as executable code in a real-world system to control hardware and/or software or in a computer-implemented training platform, the autonomous AI agent exhibits behavior by perceiving the environment, taking actions autonomously to achieve goals, and improving agent performance through learning;

tracking behavior iterations of the autonomous AI agent reacting with an environment during a training or run cycle of the autonomous AI;

collecting iteration data from the tracked iterations, the iteration data comprising which components of the autonomous AI agent are used for each iteration;

transforming the iteration data into the data characterizing the explanation of the behavior exhibited by the autonomous AI agent at different levels of granularity of the training or run cycle, the transforming comprising:

identifying data characterizing the behavior exhibited by the autonomous AI agent for each individual iteration of a training or run cycle;

identifying data characterizing the behavior exhibited by the autonomous AI agent grouped by episodes of the training or run cycle, wherein each episode represents multiple iterations which are a subset of all iterations of an entirety of the training or run cycle; and identifying data characterizing the behavior exhibited by the autonomous AI agent across an entirety of the training or run cycle comprising all the iterations; and outputting the data characterizing the explanation of behavior exhibited by the autonomous AI agent that indicates what, how, why, and/or when for the behavior of the autonomous AI agent during the training or run cycle, enabling dynamic behavior correction for the autonomous AI agent.

2. The method of claim 1, wherein the identified data characterizing the behavior exhibited by the autonomous AI agent for an individual iteration comprises a fingerprint indicating what components of the autonomous AI agent were utilized during the iteration.

3. The method of claim 1, wherein each episode corresponds to behavior by the autonomous AI agent that is identified as significant/interesting based on a score awarded for the behavior.

4. The method of claim 3, wherein behavior is identified as significant/interesting based on goals for the autonomous AI agent.

5. The method of claim 1, wherein the identified data characterizing the behavior exhibited by the autonomous AI agent grouped by episodes comprises a graphical timeline of episodes.

6. The method of claim 1, wherein the identified data characterizing the behavior exhibited by the autonomous AI agent grouped by episodes comprises an indication of a status of the environment and how the autonomous AI agent reacted at a time of each episode.

7. The method of claim 1, wherein the identified data characterizing the behavior exhibited by the autonomous AI agent across the entirety of the training or run cycle comprises a combination and clustering of data from the identified data characterizing the behavior exhibited by the autonomous AI agent for each individual iteration of the entirety of the training or run cycle.

8. The method of claim 7, wherein the combination and clustering are performed using a machine learning algorithm.

9. The method of claim 7, wherein resulting clusters represent states of the autonomous AI agent across the entirety of the training or run cycle.

10. The method of claim 1, wherein the autonomous AI agent comprises:

one or more sensor modules;

optionally one or more perceptor modules;

one or more scenario modules;

one or more skills modules; and one or more performable actions.

11. The method of claim 10, wherein the identified data characterizing the behavior exhibited by the autonomous AI agent of the behavior for each individual iteration of a training or run cycle comprises a graphical indication of which of: the one or more sensor modules, the optional one or more perceptor modules, the one or more scenario modules, the one or more skills modules, and the one or performable actions of the autonomous AI agent were used in the iteration.

12. The method of claim 1, wherein the tracking, collecting, transforming, and outputting steps are performed by the autonomous AI agent.

13. The method of claim 1, wherein the method is performed by a platform for creating autonomous AI agents.

14. The method of claim 1, wherein outputting the data characterizing the explanation of behavior exhibited by the autonomous AI agent comprises:

outputting one or more of:

identified data characterizing the behavior exhibited by the autonomous AI agent for an individual iteration of a training or run cycle;

identified data characterizing the behavior exhibited by the autonomous AI agent of the behavior grouped by episodes of the training or run cycle; and identified data characterizing the behavior exhibited by the autonomous AI agent of the behavior across the entirety of the training or run cycle.

15. The method of claim 14, wherein identified data characterizing the behavior exhibited by the autonomous AI agent for an individual iteration of a training or run cycle is outputted in response to selection on an outputted identified data characterizing the behavior exhibited by the autonomous AI agent of the behavior grouped by episodes of the training or run cycle or an outputted identified data characterizing the behavior exhibited by the autonomous AI agent of the behavior across the entirety of training or run cycle.

16. A system for identifying and outputting data characterizing an explanation of behavior exhibited by an autonomous AI agent in such a way that enables dynamic behavior correction, the system comprising:

an autonomous agent that when deployed as executable code in a real-world system to control hardware and/or software or in a computer-implemented training platform, the autonomous AI agent exhibits behavior by perceiving the environment, taking actions autonomously to achieve goals, and improving agent performance through learning;

a storage holding data; and a processor in communication with the storage, wherein the processor:

tracks behavior iterations of the autonomous AI agent reacting with an environment during a training or run cycle of the autonomous AI agent;

collects iteration data from the tracked iterations, the iteration data comprising which components of the autonomous AI agent are used for each iteration;

transforms the iteration data into the data characterizing the explanation of the behavior exhibited by the autonomous AI agent at different levels of granularity of the training or run cycle, the transforming comprising:

identifying data characterizing the behavior exhibited by the autonomous AI agent for each individual iteration of a training or run cycle;

identifying data characterizing the behavior exhibited by the autonomous AI agent grouped by episodes of the training or run cycle, wherein each episode represents multiple iterations that are a subset of all iterations of an entirety of the training or run cycle; and identifying data characterizing the behavior exhibited by the autonomous AI agent across an entirety of the training or run cycle comprising all the iterations; and outputs the data characterizing the explanation of behavior exhibited by the autonomous AI agent that indicates what, how, why, and/or when for the behavior of the autonomous AI agent during the training or run cycle, enabling dynamic behavior correction.

17. The system of claim 16 further comprising:

a display in communication with the processor configured to display the data characterizing the explanation of behavior exhibited by the autonomous AI agent output by the processor.

18. The system of claim 16, wherein the processor is also executing the autonomous AI agent.

19. The system of claim 16, wherein the identified data characterizing the behavior exhibited by the autonomous AI agent for an individual iteration comprises a fingerprint indicating what components of the autonomous AI agent were utilized during the iteration.

20. The system of claim 16, wherein each episode corresponds to behavior by the autonomous AI agent that is identified as significant/interesting based on a score awarded for the behavior.

21. The system of claim 20, wherein behavior is identified as significant/interesting based on goals for the autonomous AI agent.

22. The system of claim 16, wherein the identified data characterizing the behavior exhibited by the autonomous AI agent grouped by episodes comprises a graphical timeline of episodes.

23. The system of claim 16, wherein the identified data characterizing the behavior exhibited by the autonomous AI agent grouped by episodes comprises an indication of a status of the environment and how the autonomous AI agent reacted at a time of each episode.

24. The system of claim 16, wherein the identified data characterizing the behavior exhibited by the autonomous AI agent across the entirety of the training or run cycle comprises a combination and clustering of data from the identified data characterizing the behavior exhibited by the autonomous AI agent for each individual iteration of the entirety of the training or run cycle.

25. The system of claim 24, wherein the combination and clustering are performed using a machine learning algorithm.

26. The system of claim 24, wherein resulting clusters represent states of the autonomous AI agent across the entirety of the training or run cycle.

27. The system of claim 16, wherein the autonomous AI agent comprises:

one or more sensor modules, optionally one or more perceptor modules, one or more scenario modules, one or more skills modules, and one or more performable actions.

28. The system of claim 27, wherein the identified data characterizing the behavior exhibited by the autonomous AI agent of the behavior for each individual iteration of a training or run cycle comprises a graphical indication of which of: the one or more sensor modules, the optional one or more perceptor modules, the one or more scenario modules, the one or more skills modules, and the one or performable actions of the autonomous AI agent were used in the iteration.

29. The system of claim 16, wherein outputting the data characterizing the explanation of behavior exhibited by the autonomous AI agent comprises:

outputting one or more of:

identified data characterizing the behavior exhibited by the autonomous AI agent for an individual iteration of a training or run cycle;

identified data characterizing the behavior exhibited by the autonomous AI agent of the behavior grouped by episodes of the training or run cycle; and identified data characterizing the behavior exhibited by the autonomous AI agent of the behavior across the entirety of the training or run cycle.

30. The system of claim 29, wherein identified data characterizing the behavior exhibited by the autonomous AI agent for an individual iteration of a training or run cycle is outputted in response to selection on an outputted identified data characterizing the behavior exhibited by the autonomous AI agent of the behavior grouped by episodes of the training or run cycle or an outputted identified data characterizing the behavior exhibited by the autonomous AI agent of the behavior across the entirety of training or run cycle.

* * * * *